US012589039B2

(12) United States Patent
Goto et al.

(10) Patent No.: US 12,589,039 B2
(45) Date of Patent: Mar. 31, 2026

(54) VEHICLE

(71) Applicant: Honda Motor Co., Ltd., Tokyo (JP)

(72) Inventors: Masaki Goto, Saitama (JP); Tomokazu Sakamoto, Saitama (JP); Yuta Kimura, Saitama (JP); Kazumasa Ozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 18/590,947

(22) Filed: Feb. 29, 2024

(65) Prior Publication Data

US 2024/0325221 A1 Oct. 3, 2024

(30) Foreign Application Priority Data

Mar. 29, 2023 (JP) ................................ 2023-054255

(51) Int. Cl.
*A61G 5/10* (2006.01)
*A61G 5/04* (2013.01)

(52) U.S. Cl.
CPC ............ *A61G 5/104* (2013.01); *A61G 5/041* (2013.01); *A61G 5/1059* (2013.01); *A61G 2203/42* (2013.01)

(58) Field of Classification Search
None
See application file for complete search history.

(56) References Cited

U.S. PATENT DOCUMENTS 7,347,426 B2 * 3/2008 Negishi .................. A61G 5/066 280/5.22
11,844,734 B2 * 12/2023 Takenaka ............. A61G 5/1059
11,993,345 B2 * 5/2024 Yada ........................ B62K 1/00
12,093,061 B2 * 9/2024 Sakamoto ............ G05D 1/6482
12,103,348 B2 * 10/2024 Sakamoto ............ B62K 11/007
2015/0061312 A1 * 3/2015 Ishige .................... B62J 45/413 296/65.01
2019/0278300 A1 * 9/2019 Katsuki .................... B62J 45/42
2020/0237586 A1 * 7/2020 Choi .................... A61G 5/1091
2021/0244585 A1 * 8/2021 Ohta ........................ A61G 5/04
2023/0294787 A1 * 9/2023 Sakamoto ............ A61G 5/1029 701/124
2023/0294788 A1 * 9/2023 Ozaki .................... A61G 5/043 701/49

FOREIGN PATENT DOCUMENTS

WO 2019244444 12/2019

* cited by examiner

*Primary Examiner* — Daniel L Greene
(74) *Attorney, Agent, or Firm* — JCIPRNET

(57) ABSTRACT

A vehicle includes: a vehicle body frame; a drive unit, provided in the vehicle body frame and movable on a road surface; a seat, arranged above the vehicle body frame and supporting buttocks of a user; a lifting device, provided between the vehicle body frame and the seat and lifting or lowering the seat between a low position and a high position; a position specifier, provided in the vehicle body frame and detecting a position of the vehicle; and a control device, controlling the drive unit and the lifting device. The control device includes an inclination specifier that specifies a road surface inclination angle at the position of the vehicle based on a detection result of the position specifier. When the seat is at the low position and a lifting prohibition condition is satisfied, the control device prohibits lifting drive of the lifting device.

11 Claims, 10 Drawing Sheets

VEHICLE

CROSS-REFERENCE TO RELATED APPLICATIONS

This application claims the priority benefit of Japan Application No. 2023-054255, filed on Mar. 29, 2023. The entirety of the above-mentioned patent application is hereby incorporated by reference herein and made a part of this specification.

BACKGROUND

Technical Field

The disclosure relates to a vehicle that includes a drive unit and a seat provided on the drive unit via a lifting device.

Related Art

In recent years, initiatives to provide access to sustainable transportation systems that take into account people in vulnerable positions such as the elderly, the disabled, and children among traffic participants are becoming active. In order to achieve this, research and development for improving traffic safety or convenience have been conducted through the development related to vehicles.

International Publication No. 2019/244444 discloses a vehicle including a drive unit, a seat provided on the drive unit via a lifting device, and a plurality of support legs extending downward from the seat. The plurality of support legs have rollers at lower ends and are grounded to a floor via the rollers. When the seat is at a low position, the plurality of support legs are grounded to the floor, thereby maintaining a posture of the vehicle. When the seat is at a high position, the plurality of support legs leave the floor. In this state, the vehicle maintains the posture by inverted pendulum control of the drive unit.

When the seat is at the high position, a user is at a relatively high position, and relatively high stability and safety are thus required for the vehicle.

SUMMARY

One aspect of the disclosure provides a vehicle including: a vehicle body frame; a drive unit, provided in the vehicle body frame and movable on a road surface; a seat, arranged above the vehicle body frame and supporting buttocks of a user; a lifting device, provided between the vehicle body frame and the seat and lifting or lowering the seat between a low position and a high position; a position specifier, provided in the vehicle body frame and detecting a position of the vehicle; and a control device, controlling the drive unit and the lifting device. The control device includes an inclination specifier that specifies a road surface inclination angle of the road surface at the position of the vehicle based on a detection result of the position specifier. When the seat is at the low position and a lifting prohibition condition including a condition related to the road surface inclination angle is satisfied, the control device prohibits lifting drive of the lifting device.

Another aspect of the disclosure provides a vehicle including: a vehicle body frame; a drive unit, provided in the vehicle body frame and causing the vehicle body frame to move with respect to a road surface; a roller, provided to be able to be lifted and lowered with respect to the vehicle body frame and displaceable to a landing position in contact with the road surface and a lifting position away from the road surface; a lifting device, lifting or lowering the roller between the landing position and the lifting position; a position specifier, provided in the vehicle body frame and detecting a position of the vehicle; and a control device, controlling the drive unit and the lifting device. The control device includes an inclination specifier that specifies a road surface inclination angle of the road surface at the position of the vehicle based on a detection result of the position specifier. When a lifting prohibition condition including a condition related to the road surface inclination angle is satisfied, the control device controls the lifting device to prohibit the roller from occupying the lifting position.

DESCRIPTION OF THE EMBODIMENTS

Figure 1:
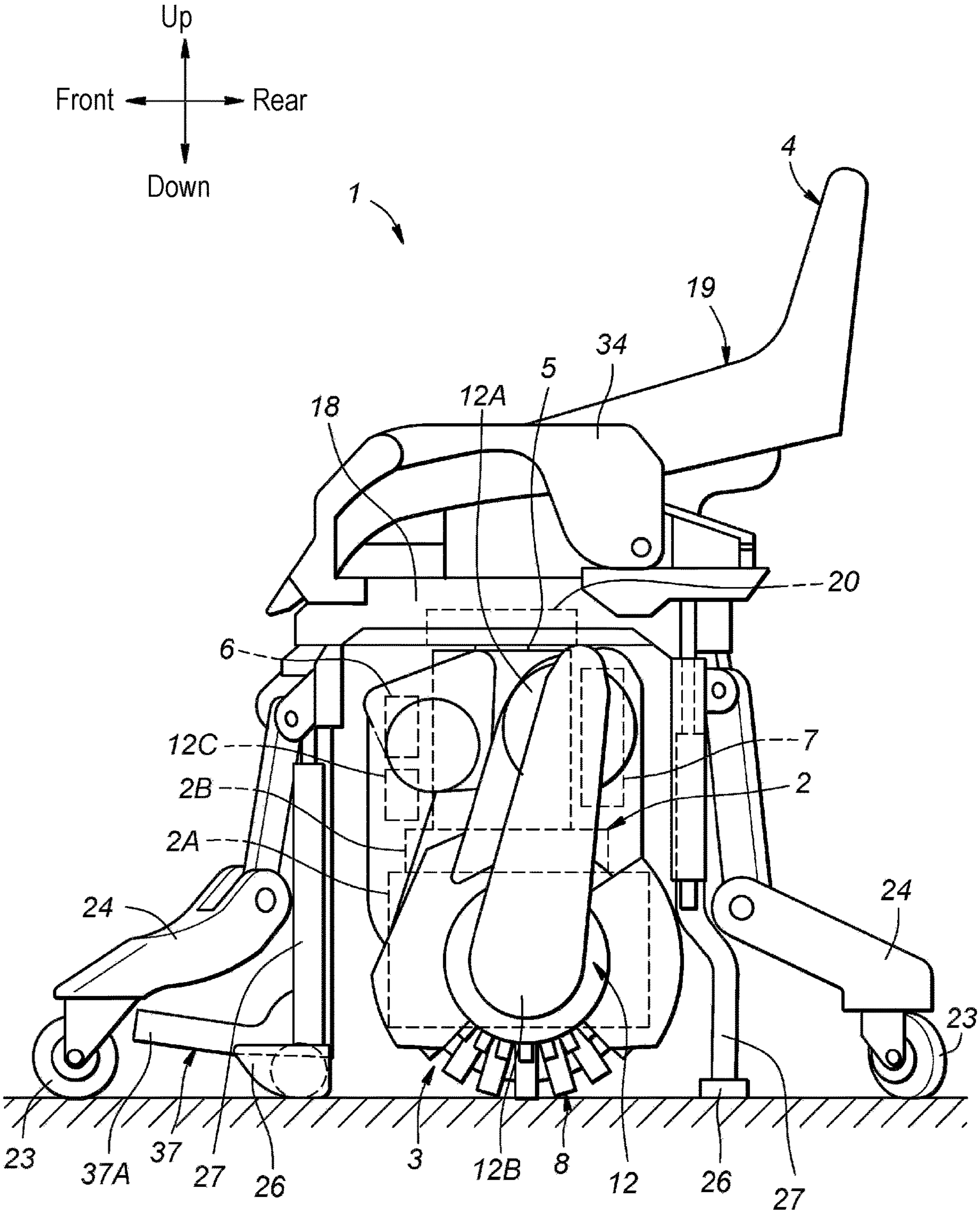
FIG. 1 is a side view of a vehicle according to the disclosure when a seat is at a low position, as viewed from the left.

According to the disclosure, safety in a vehicle in which a seat is movable between a low position and a high position is improved. This accordingly contributes to the development of a sustainable transportation system.

An aspect of the disclosure provides a vehicle (1) including: a vehicle body frame (2); a drive unit (3), provided in the vehicle body frame and movable on a road surface; a seat (4), arranged above the vehicle body frame and supporting buttocks of a user; a lifting device (5), provided between the vehicle body frame and the seat and lifting or lowering the seat between a low position and a high position; a position specifier (45), provided in the vehicle body frame and detecting a position of the vehicle; and a control device (6), controlling the drive unit and the lifting device. The control device includes an inclination specifier (50) that specifies a road surface inclination angle (8) of the road surface at the position of the vehicle based on a detection result of the position specifier. When the seat is at the low position and a lifting prohibition condition including a condition related to the road surface inclination angle is satisfied, the control device prohibits lifting drive of the lifting device.

According to this aspect, since the control device prohibits the lifting drive of the lifting device when the lifting prohibition condition including the condition related to the road surface inclination angle is satisfied, the safety of the vehicle is improved. Thus, a safe and highly convenient vehicle can be provided to people in vulnerable positions, and this can accordingly contribute to the development of a sustainable transportation system.

In the above aspect, preferably, the lifting prohibition condition includes at least a condition that the road surface inclination angle specified by the inclination specifier is equal to or greater than a first angle threshold (81).

According to this aspect, determination as to the lifting prohibition condition related to the road surface inclination angle is facilitated.

In the above aspect, preferably, the control device stores an inclination map (49A) indicating a relationship between the position and the road surface inclination angle. Based on the inclination map, the inclination specifier specifies the road surface inclination angle at the position specified by the position specifier.

According to this aspect, the road surface inclination angle can be easily acquired.

In the above aspect, preferably, the control device is configured to be able to communicate with a server (61) that stores an inclination map (61A) indicating a relationship between the position and the road surface inclination angle. By communicating with the server, the inclination specifier specifies the road surface inclination angle at the position specified by the position specifier.

According to this aspect, the road surface inclination angle can be easily acquired.

In the above aspect, preferably, when the seat is at the high position and a lowering condition is satisfied, the control device performs lowering drive of the lifting device. The lowering condition includes that the road surface inclination angle (A) of the road surface ahead in a traveling direction is equal to or greater than a second angle threshold (82).

According to this aspect, since the seat moves to the low position when the road surface inclination angle is equal to or greater than the second angle threshold, the safety of the vehicle is improved.

In the above aspect, preferably, when the seat is at the high position and the road surface ahead in the traveling direction satisfies an avoidance condition, the control device controls the drive unit to avoid forward movement in the traveling direction. The avoidance condition includes that the road surface inclination angle (A) of the road surface ahead in the traveling direction is equal to or greater than a third angle threshold (83).

According to this aspect, since forward movement in the traveling direction is avoided when the road surface inclination angle ahead in the traveling direction is equal to or greater than the third angle threshold, the safety of the vehicle is improved.

In the above aspect, preferably, the drive unit includes an electric motor (12A) and a power drive unit (12C) that supplies electric power to the electric motor. The control device determines whether the vehicle has an abnormality. The vehicle includes: a battery (7), provided in the vehicle body frame; an SOC acquisition part (7A), acquiring a state of charge (SOC) of the battery; and a temperature acquisition part (12D, 12E, 7B), acquiring a temperature of at least one of the power drive unit, the electric motor, and the battery. The lifting prohibition condition includes at least one of following: the road surface inclination angle being equal to or greater than the first angle threshold; the temperature of the power drive unit being equal to or greater than a first power drive unit temperature threshold; the temperature of the electric motor being equal to or greater than a first electric motor temperature threshold; the temperature of the battery being equal to or greater than a first battery temperature threshold; the SOC of the battery being equal to or less than a first SOC threshold; and the control device detecting an abnormality in the vehicle.

According to this aspect, since movement of the seat to the high position is prohibited when at least one of following cases is satisfied: a case where the SOC decreases, a case where the temperature of the power drive unit is high, a case where the temperature of the electric motor is high, a case where the temperature of the battery is high, a case where the road surface is inclined by a predetermined value or more, and a case where an abnormality occurs in the vehicle, the safety of the vehicle is improved.

In the above aspect, preferably, the vehicle further includes at least one leg (24) extending downward from the seat and having a roller (23) at a lower end. When the seat is at the high position, the roller leaves the road surface. When the seat is at the low position, the roller contacts the road surface.

According to this aspect, since the leg is grounded when the seat is at the low position, the posture of the vehicle is stabilized.

In the above aspect, preferably, the control device controls the drive unit based on inverted pendulum control.

According to this aspect, the safety of the vehicle in which the inverted pendulum control is performed is improved.

In the above aspect, preferably, the drive unit is movable in all directions along the road surface.

According to this aspect, the vehicle is able to move in all directions.

An aspect of the disclosure provides a vehicle (1) including: a vehicle body frame (2); a drive unit (3), provided in the vehicle body frame and causing the vehicle body frame to move with respect to a road surface; a roller (23), provided to be able to be lifted and lowered with respect to the vehicle body frame and displaceable to a landing position in contact with the road surface and a lifting position away from the road surface; a lifting device (5), lifting or lowering the roller between the landing position and the lifting position; a position specifier (45), provided in the vehicle body frame and detecting a position of the vehicle; and a control device (6), controlling the drive unit and the lifting device. The control device includes an inclination specifier (50) that specifies a road surface inclination angle (8) of the road surface at the position of the vehicle based on a detection result of the position specifier. When a lifting prohibition condition including a condition related to the road surface inclination angle is satisfied, the control device controls the lifting device to prohibit the roller from occupying the lifting position.

According to this aspect, when the lifting prohibition condition is satisfied, the roller is prevented from occupying the lifting position. Hence, the roller is likely to land on the road surface, and the safety of the vehicle is improved. According to this aspect, a safe and highly convenient vehicle can be provided to people in vulnerable positions, and this can accordingly contribute to the development of a sustainable transportation system.

According to the above configuration, the safety in the vehicle in which the seat is movable between the low position and the high position can be improved.

Embodiments of a vehicle according to the disclosure will be described below with reference to the drawings. In the present embodiment, the vehicle is configured as an inverted pendulum type vehicle.

First Embodiment

Figure 2:
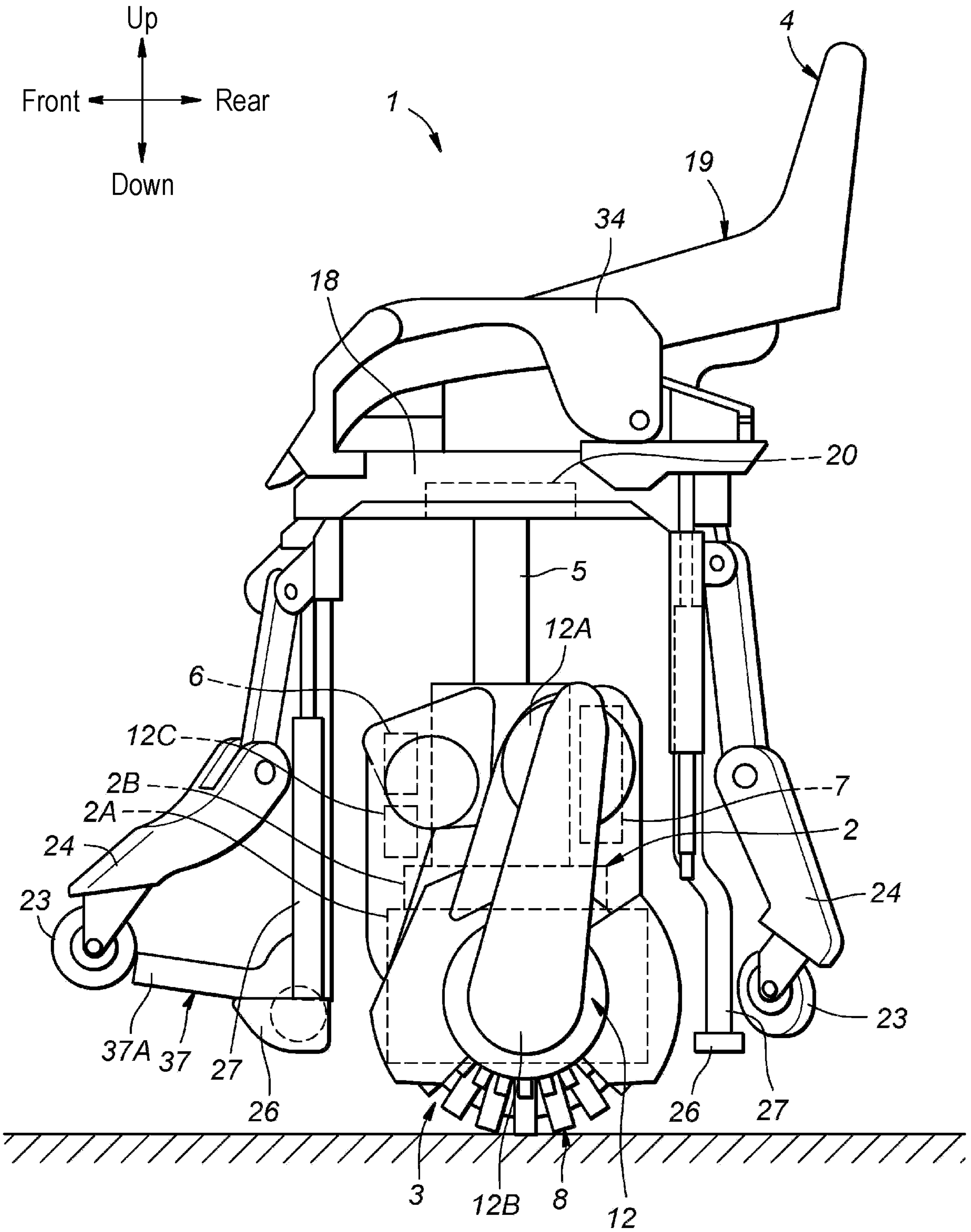
FIG. 2 is a side view of the vehicle according to the disclosure when the seat is at a high position, as viewed from the left.

As illustrated in FIG. 1 and FIG. 2, a vehicle 1 includes: a vehicle body frame 2; at least one drive unit 3, provided in the vehicle body frame 2 and movable on a road surface; a seat 4, arranged above the vehicle body frame 2 and supporting buttocks of a user; a lifting device 5, provided between the vehicle body frame 2 and the seat 4; a control device 6, controlling the drive unit 3 and the lifting device 5; and a battery 7, provided in the vehicle body frame 2.

The vehicle body frame 2 includes a lower frame 2A and an upper frame 2B connected to an upper part of the lower frame 2A. The upper frame 2B is connected to the lower frame 2A so as to be rotatable about each of a rotating shaft extending in a front-rear direction and a rotating shaft extending in a left-right direction. Accordingly, the upper frame 2B is able to tilt in the front-rear and left-right directions with respect to the lower frame 2A.

Figure 3:
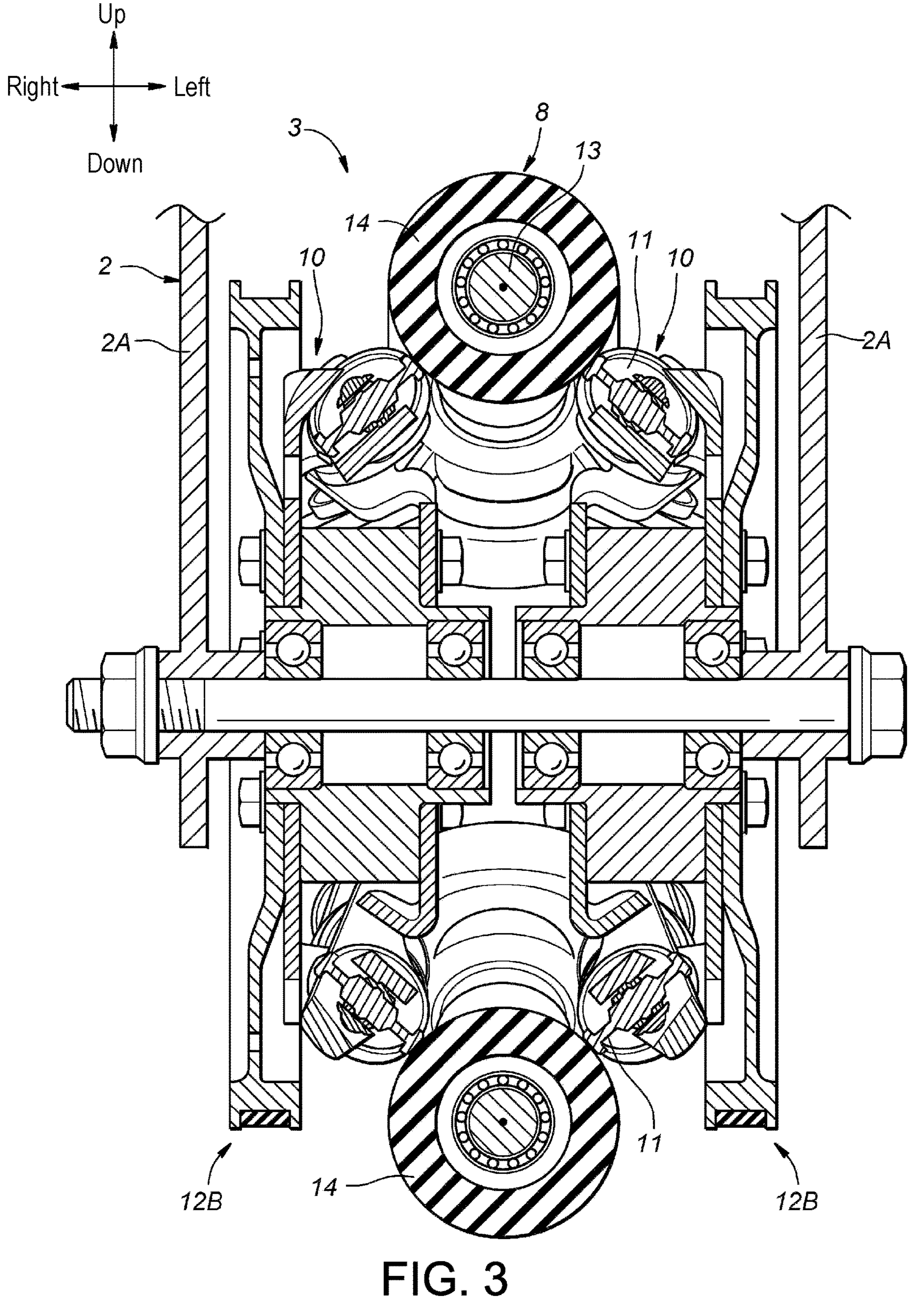
FIG. 3 is a cross-sectional view of a drive unit.

The drive unit 3 is provided in the vehicle body frame 2, and causes the vehicle body frame 2 to move along the road surface. In the present embodiment, a pair of left and right drive units 3 are provided on left and right sides of the lower frame 2A. Each drive unit 3 includes a drive wheel 8 that is under inverted pendulum control. In the present embodiment, each drive unit 3 is a friction drive device movable in all directions along the road surface. As illustrated in FIG. 3, the friction drive device includes: a pair of drive disks 10, rotatably supported by the lower frame 2A; a plurality of drive rollers 11, rotatably supported by each of the drive disks 10; the drive wheel 8 of an annular shape, arranged between the drive disks 10 on the left and right and in contact with the drive roller 11; and a pair of actuators 12, independently rotating each of the pair of drive disks 10. The pair of drive disks 10 are arranged coaxially with each other, and their rotation axes extend in the left-right direction.

As illustrated in FIG. 1, each actuator 12 includes an electric motor 12A and a transmission mechanism 12B that transmits a rotational force of the electric motor 12A to the corresponding drive disk 10. The transmission mechanism 12B may be, for example, a belt transmission mechanism. The electric motor 12A may be arranged above the drive disk 10.

The drive unit 3 includes a power drive unit 12C that supplies electric power to the electric motor 12A. In other embodiments, the power drive unit 12C may be provided separately from the drive unit 3.

The power drive unit 12C is an inverter circuit composed of a power semiconductor. The power semiconductor may be an insulated gate bipolar transistor (IGBT), a field effect transistor (FET), or the like. The power drive unit 12C controls the electric power supplied from the battery 7 to the electric motor 12A based on a signal from the control device 6, thereby controlling rotation of the electric motor 12A. The power drive unit 12C may have a function of the control device 6.

The drive unit 3 includes a first temperature sensor 12D as a temperature acquisition part that acquires a temperature Tp of the power drive unit 12C. The first temperature sensor 12D may be provided in the power drive unit 12C. The first temperature sensor 12D is connected to the control device 6. The first temperature sensor 12D may be connected to the power drive unit 12C, and the power drive unit 12C may acquire temperature information. The control device 6 may communicate with the power drive unit 12C and acquire the temperature information. In other embodiments, the control device 6 may constitute the temperature acquisition part. The control device 6 may acquire a value of a current flowing through the power drive unit 12C, and estimate the temperature Tp of the power drive unit 12C based on the value of the current.

The drive unit 3 includes a second temperature sensor 12E as a temperature acquisition part that acquires a temperature Tm of the electric motor 12A. The second temperature sensor 12E is connected to the control device 6. The second temperature sensor 12E may be connected to the power drive unit 12C, and the power drive unit 12C may acquire the temperature information. The control device 6 may communicate with the power drive unit 12C and acquire the temperature information. In other embodiments, the control device 6 may constitute the temperature acquisition part. The control device 6 may acquire a value of a current flowing through the electric motor 12A, and estimate the temperature Tm of the electric motor 12A based on the value of the current.

As illustrated in FIG. 1 and FIG. 3, the drive wheel 8 has an annular shape, and is arranged between the pair of drive disks 10 and coaxially therewith. The drive wheel 8 contacts the plurality of drive rollers 11, and is rotatable around a central axis and around an annular axis The drive wheel 8 includes, for example, a core body 13 of an annular shape and a plurality of driven rollers 14 rotatably supported by the core body 13. Each driven roller 14 is supported by the core body 13 so as to be rotatable about an axis of the core body 13 of an annular shape. Each driven roller 14 receives a load from the drive disk 10 and rotates with respect to the core body 13.

When the pair of drive disks 10 rotate in the same direction at the same rotation speed, the drive wheel 8 rotates in the same direction at the same rotation speed as the drive disk 10. When a difference occurs in the rotation direction or rotation speed between the pair of drive disks 10, the driven roller 14 of the drive wheel 8 rotates with respect to the core body 13. Accordingly, the drive unit 3 is able to generate propulsive force in the left-right direction with respect to the road surface.

The battery 7 is supported by a rear part of the lower frame 2A. The control device 6 is supported inside the lower frame 2A or by the rear part of the lower frame 2A.

The battery 7 supplies electric power to various devices mounted on the vehicle 1 including the drive unit 3 and the control device 6. The battery 7 includes an SOC acquisition part 7A. The SOC acquisition part 7A functions as an SOC acquisition part that acquires a state of charge (SOC) (also referred to as remaining capacity) of the battery 7 based on a voltage of the battery 7. The battery 7 includes a third temperature sensor 7B as a temperature acquisition part that acquires a temperature Tb of the battery 7. The third temperature sensor 7B is connected to the control device 6. The third temperature sensor 7B may be connected to a temperature acquisition part of the battery 7, and the temperature acquisition part may be connected to the control device 6. The control device 6 may acquire a value of a current flowing from the battery 7, and estimate the temperature Tb of the battery 7 based on the value of the current.

The lifting device 5 is a device that lifts and lowers the seat 4 between a low position and a high position. The seat 4 includes a seat frame 18 supported by the lifting device 5 and a pad 19 supported by an upper part of the seat frame 18. The user can be seated on the pad 19. The lifting device 5 is coupled to the upper frame 2B of the vehicle body frame 2 and the seat frame 18. The lifting device 5 expands and contracts in the up-down direction, thereby displacing the seat frame 18 in the up-down direction with respect to the upper frame 2B of the vehicle body frame 2. The lifting device 5 may be, for example, a ball screw mechanism or a rack and pinion mechanism driven by an electric motor, or may be a linear motor. The lifting device 5 may be an air cylinder that expands and contracts with compressed air from a compressor. The lifting device 5 may include a holding mechanism 5A for holding the seat 4 at the high position. When the holding mechanism 5A is released, the seat 4 may move from the high position to the low position. The energy required to release the holding mechanism 5A is preferably less than the energy required for lowering drive by a drive source such as an electric motor.

The lifting device 5 may include, for example, a base supported by the upper frame 2B, a movable body provided on the base so as to be movable up and down and coupled to the seat frame 18, a ball screw mechanism moving the movable body with respect to the base, and an electric motor driving the ball screw mechanism.

As illustrated in FIG. 2, the high position of the seat 4 may be located vertically above the low position of the seat 4. In other embodiments, the high position of the seat 4 may be laterally offset with respect to the low position of the seat 4.

Figure 4:
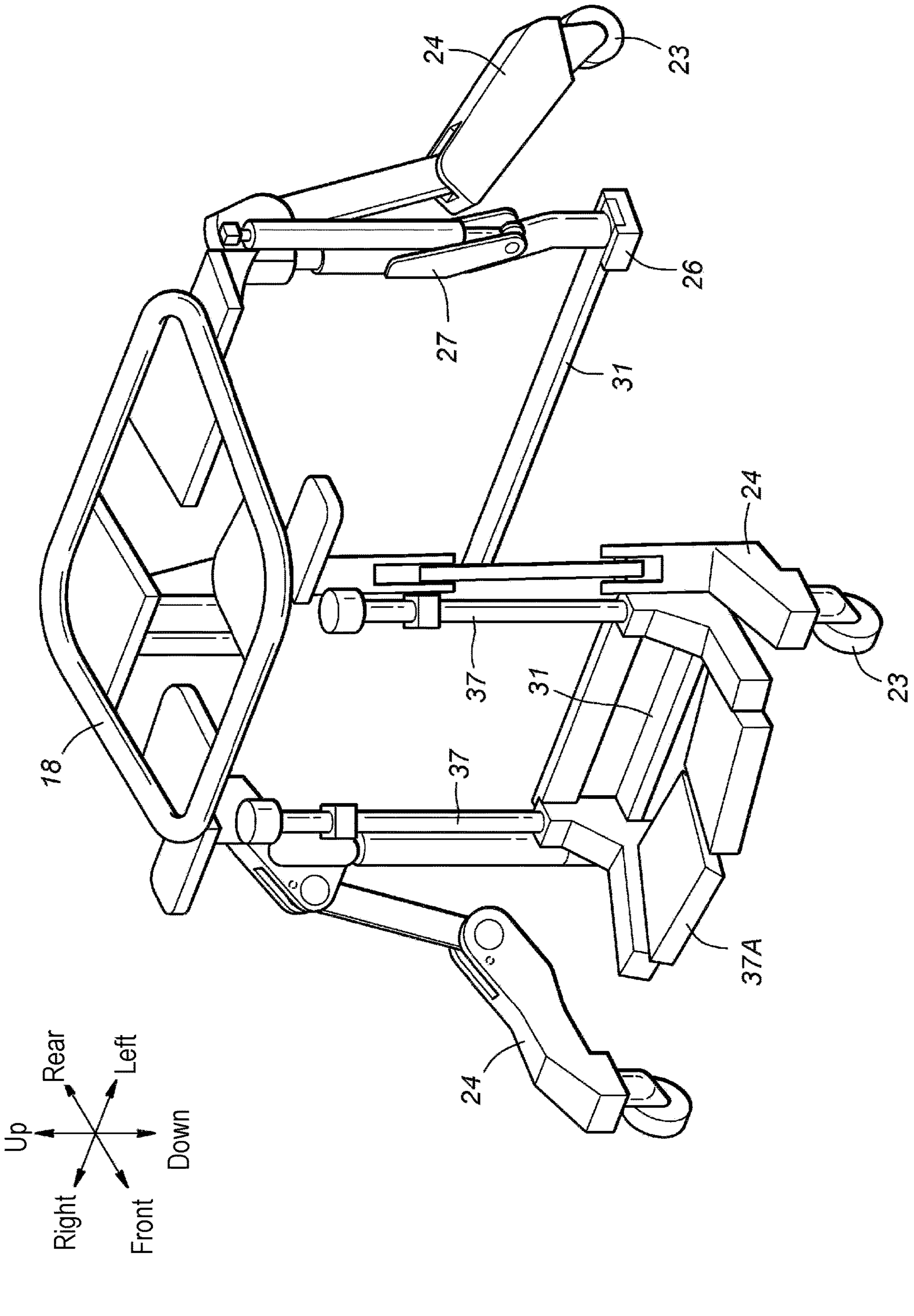
FIG. 4 is a perspective view of a seat frame assembly.

As illustrated in FIG. 4, the seat frame 18 is formed in a rectangular frame shape in a plan view. The seat frame 18 is coupled to an upper end of the lifting device 5. The seat frame 18 supports the pad 19 from below.

In the present embodiment, the lifting device 5 is connected to the seat frame 18 via a cushion material 20 (see FIG. 2) that is elastically deformable. Hence, due to elastic deformation of the cushion material 20, the seat frame 18 is able to slightly tilt in the front-rear and left-right directions with respect to the upper frame 2B. However, when the seat 4 is at the high position, by inverted pendulum control, the drive unit 3 performs driving so that a seating surface 4A (see FIG. 6; specifically an upper surface of the seat frame 18) of the seat 4 becomes substantially horizontal.

The vehicle 1 includes: at least one first leg 24, extending downward from the seat 4 and having a roller 23 at a lower end; and at least one second leg 27, extending downward from the seat 4 and having a contact member 26 at a lower end. In the present embodiment, the vehicle 1 includes four first legs 24 and four second legs 27. Each first leg 24 and each second leg 27 is rotatably coupled to the seat frame 18. The first legs 24 have a similar configuration to each other, and the second legs 27 have a similar configuration to each other.

The first leg 24 is rotatable between a stored position arranged in proximity to the vehicle body frame 2 and an extended position laterally farther from the vehicle body frame 2 than the stored position. The first leg 24 may have a joint at an intermediate portion in a longitudinal direction.

The roller 23 is rotatably coupled to a lower end of the first leg 24. The roller 23 may be a caster whose rotational shaft rotates around a vertical axis with respect to the first leg 24. In other embodiments, a ball instead of the roller 23 may be supported at the lower end of the first leg 24.

The first leg 24 includes an energization member (not illustrated) that energizes the first leg 24 from the extended position toward the stored position. The first leg 24 may include a damper that dampens rotation. The damper may be a rotary damper or a piston damper.

The second leg 27 is able to expand and contract in the up-down direction and is energized in an expansion direction. The contact member 26 is provided at a lower end of the second leg 27. The contact member 26 preferably has greater flexibility than the second leg 27. The contact member 26 preferably has a higher coefficient of friction than the second leg 27. The contact member 26 may be made of, for example, rubber or elastomer. By grounding the contact member 26, the vehicle 1 grounded via the roller 23 can be maintained in a stopped state. By a frictional force between the contact member 26 provided at the lower end of the second leg 27 and the road surface, the vehicle 1 is maintained in the stopped state. Since the vehicle 1 is maintained in the stopped state by the frictional force between the contact member 26 and the road surface, there is no need to supply electric power to the drive unit 3, and energy efficiency can be improved. By stopping the vehicle 1, when the seat 4 is moved to the high position and the inverted pendulum control is started, a position of the center of gravity of the vehicle 1 can be easily determined.

The second leg 27 is energized in the expansion direction by the energization member. The energization member may be a compression coil spring. The second leg 27 may include a damper that dampens expansion and contraction operations. The damper may be a piston damper. Two adjacent second legs 27 have their lower parts connected to each other by a connecting member 31.

As illustrated in FIG. 2, when the seat 4 is at the high position, each roller 23 and each contact member 26 are away from the road surface. That is, when the seat 4 is at the high position, the roller 23 is located at a position (hereinafter lifting position) away from the road surface. When the seat 4 is at the high position, a lower end of each contact member 26 is arranged below a lower end of each roller 23. As illustrated in FIG. 1, when the seat 4 is at the low position, each roller 23 and each contact member 26 contact the road surface. That is, when the seat 4 is at the low position, each roller 23 is located at a position (hereinafter landing position) in contact with the road surface. When the seat 4 moves from the high position to the low position, each contact member 26 contacts the road surface earlier than each roller 23. Accordingly, when the seat 4 moves to the low position, the vehicle 1 can be brought to the stopped state early.

Each first leg 24 is pushed by the road surface and moves from the stored position to the extended position. Accordingly, a distance between grounding points of the first leg 24 is increased, and the posture of the vehicle 1 at the low position is stabilized.

Each second leg 27 is connected to a lever 34 via a transmission mechanism. In the present embodiment, a pair of left and right levers 34 are provided on left and right sides of the seat 4. When the seat 4 is at the low position, the user is able to move the second leg 27 to a contracted position by operating the lever 34. Accordingly, when the seat 4 is at the low position, the contact member 26 leaves the road surface, and the vehicle 1 is able to travel.

As illustrated in FIG. 4, the vehicle 1 includes at least one support member 37 extending downward from the seat 4. The support member 37 includes in a lower part thereof a footrest 37A that supports the sole of the foot of the user. The support member 37 and the footrest 37A are away from the road surface regardless of the position of the seat 4.

Figure 5:
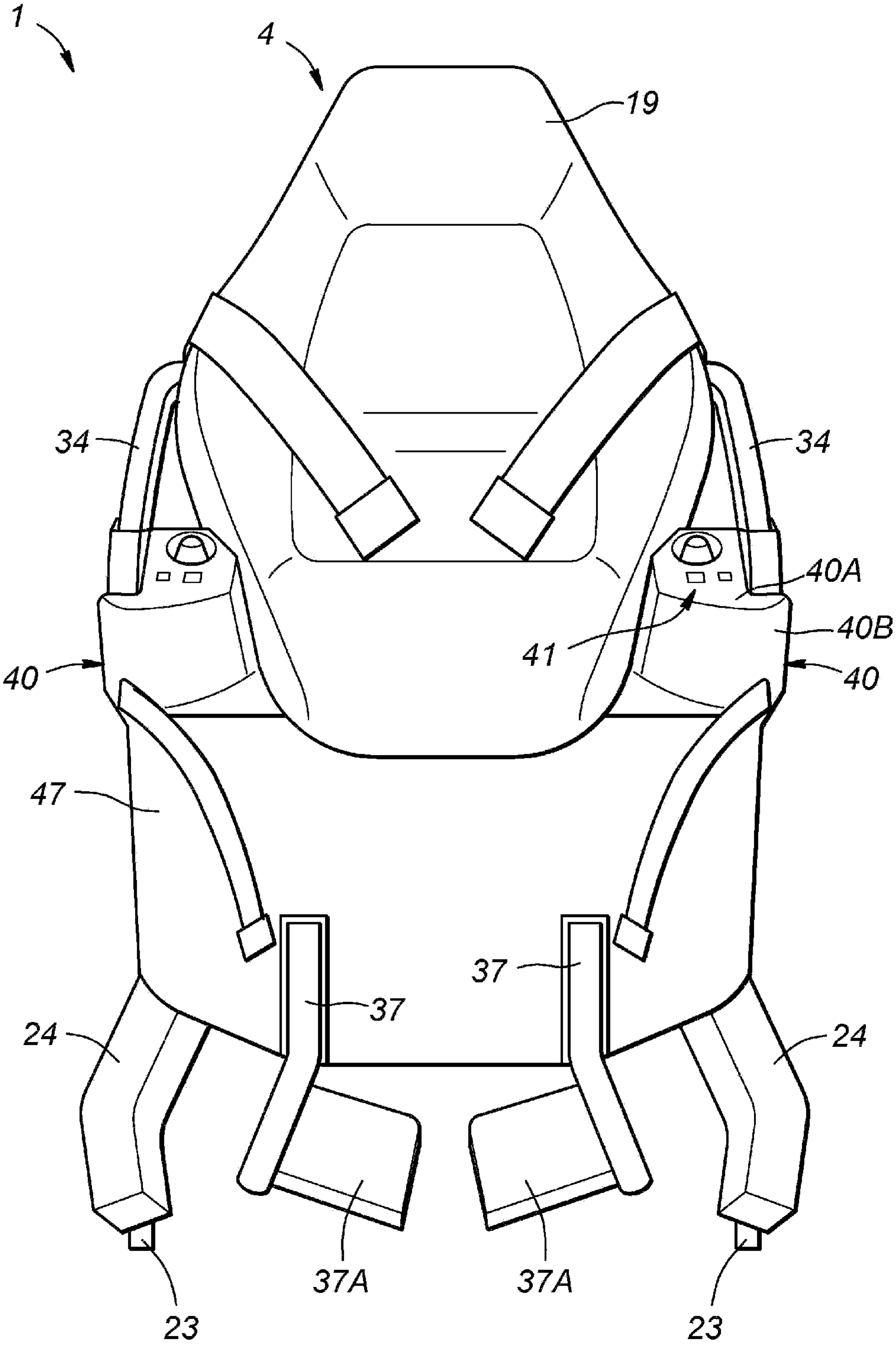
FIG. 5 is a perspective view of the vehicle according to the disclosure, as viewed from above the front side.
Figure 6:
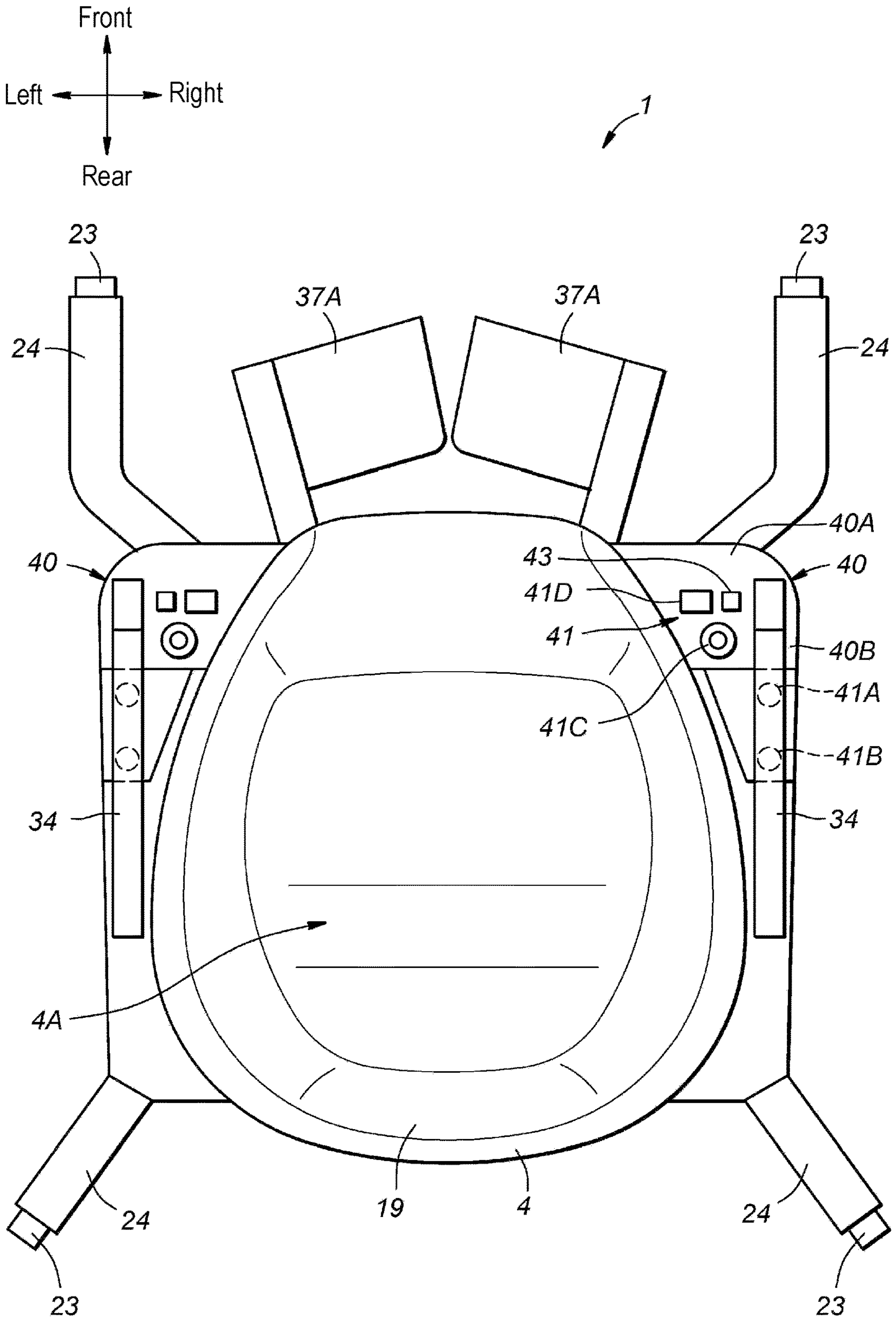
FIG. 6 is a plan view of the vehicle according to the disclosure.

As illustrated in FIG. 5 and FIG. 6, the vehicle 1 includes an operation device 40 provided on at least one of the left side and the right side of the seat 4. In the present embodiment, the operation device 40 is provided on both the left and right sides of the seat 4. Accordingly, even if the user has a disability in either the left hand or the right hand, they can operate the vehicle 1 with the other hand. The operation devices 40 on the left and right preferably have the same configuration.

The operation device 40 includes an operation panel 40B having an operation surface 40A facing upward, and a plurality of operators 41 provided on the operation surface 40A. The lever 34 constitutes a portion of the operation device 40 and extends upward and forward from a rear part of the operation panel 40B. The operation panel 40B may be supported by the seat frame 18. The operation panel 40B extends in the front-rear direction along a side of the pad 19.

As illustrated in FIG. 6, the plurality of operators 41 include a power switch 41A, a lifting switch 41B, a movement direction switch 41C, and a traveling mode changeover switch 41D. The power switch 41A, the lifting switch 41B, the movement direction switch 41C, and the traveling mode changeover switch 41D may be provided in each of the operation devices 40 on the left and right. The plurality of operators 41 are connected to the control device 6.

The movement direction switch 41C is a switch for operating the drive unit 3. The movement direction switch 41C is an operator that receives a direction input from the user that corresponds to at least the forward, rearward, leftward, and rightward directions. The movement direction switch 41C may be a joystick. In other embodiments, the movement direction switch 41C may be a four button switch corresponding to the forward, rearward, rightward, and leftward directions.

The traveling mode changeover switch 41D is an operator that receives a mode switching input from the user that corresponds to mode switching. The traveling mode changeover switch 41D may be a press switch.

The operation surface 40A is provided with an indicator 43 for notifying of a traveling mode in execution. The indicator 43 may include a first light emitting part corresponding to a translational movement mode and a second light emitting part corresponding to a turning movement mode. The indicator 43 may be a display provided on the operation surface 40A.

At least one of the plurality of operators 41 may indicate a state of the vehicle 1 by lighting. For example, the power switch 41A may emit light when the vehicle 1 is powered on, that is, in an activated state. The lifting switch 41B may emit light while the lifting device 5 is being driven. The lifting switch 41B may change the color of the emitted light depending on the position of the seat 4. The traveling mode changeover switch 41D may change the color of the emitted light depending on the selected traveling mode.

The vehicle body frame 2 is provided with an inclination angle sensor 44 as an inclination angle acquisition part that acquires an inclination angle θf of the upper frame 2B with respect to a horizontal plane. The inclination angle sensor 44 may be a gyro sensor. The inclination angle sensor 44 may be composed of a known device that sequentially measures (estimates) the inclination angle θf by detecting acceleration and angular velocity in three axial directions and performing strapdown type arithmetic processing. However, the inclination angle sensor 44 is not limited to this aspect. For example, the inclination angle sensor 44 may be a sensor that detects the inclination angle θf based on a change in a direction of gravitational acceleration with respect to the upper frame 2B. In that case, the inclination angle sensor 44 may be composed of a known device based on MEMS technology.

The upper frame 2B is rotatably connected to the lower frame 2A in each of the front-rear direction and the left-right direction. Hence, the inclination angle sensor 44 may acquire each of an inclination angle θfx in the front-rear direction and an inclination angle θfy in the left-right direction of the upper frame 2B with respect to the horizontal plane. Since the upper frame 2B is able to tilt in each of the front-rear and left-right directions with respect to the lower frame 2A, the inclination angle θf detected by the inclination angle sensor 44 differs from an inclination angle of the lower frame 2A with respect to the horizontal plane, that is, an inclination angle (hereinafter road surface inclination angle δ) of the road surface with respect to the horizontal plane.

The vehicle body frame 2 is provided with a position specifier 45 for specifying a position of the vehicle 1. The position specifier 45 may be any device if it acquires information for specifying the position of the vehicle 1 (preferably the position of the vehicle body frame 2), and may be composed of various sensors. The position specifier 45 may be provided in the upper frame 2B or in the lower frame 2A. The position specifier 45 outputs a detection result to the control device 6.

In the present embodiment, the position specifier 45 is composed of a positioning sensor. The positioning sensor may be a GPS sensor 45A that acquires a signal from a Global Positioning System (GPS) satellite, specifies a position (for example, latitude and longitude) on the earth and outputs the specified position to the control device 6.

In addition, the position specifier 45 may be composed of a camera 45B that images the front or the surroundings of the vehicle 1. In this case, when the position specifier 45 is composed of the camera 45B, the control device 6 may specify the position of the vehicle 1 by performing known image recognition on an acquired image. The position specifier 45 may also be composed of a proximity sensor 45C that detects proximity to an object located ahead of or around the vehicle 1. The proximity sensor 45C may be configured to be able to communicate with an oscillator arranged in a range (for example, inside an amusement park or an art museum) in which the vehicle 1 moves. At this time, the control device 6 may specify the position of the vehicle 1 based on a communication result between the proximity sensor 45C and the oscillator.

The vehicle 1 includes a seat position sensor 46 that detects the position of the seat 4 with respect to the vehicle body frame 2. The seat position sensor 46 at least detects that the seat 4 is at the low position and the high position. The seat position sensor 46 may be, for example, a proximity switch or a contact switch. The seat position sensor 46 may acquire the position of the seat 4 based on an expansion/contraction state of the lifting device 5. The seat position sensor 46 is connected to the control device 6.

An outer shell 47 may be attached to a lower part of the vehicle 1. Each second leg 27, each support member 37, and an upper part of each first leg 24 may be arranged inside the outer shell 47. The lower end of the first leg 24 and the footrest 37A may protrude to the outside of the outer shell 47.

The control device 6 is an arithmetic unit including a processor such as a microprocessor (MPU), a memory such as a nonvolatile memory or a volatile memory, a storage device such as a solid state drive (SSD), and an interface. By the processor executing an application program (hereinafter program) stored in the nonvolatile memory, the control device 6 controls the vehicle 1 in accordance to a corresponding control method.

Figure 7:
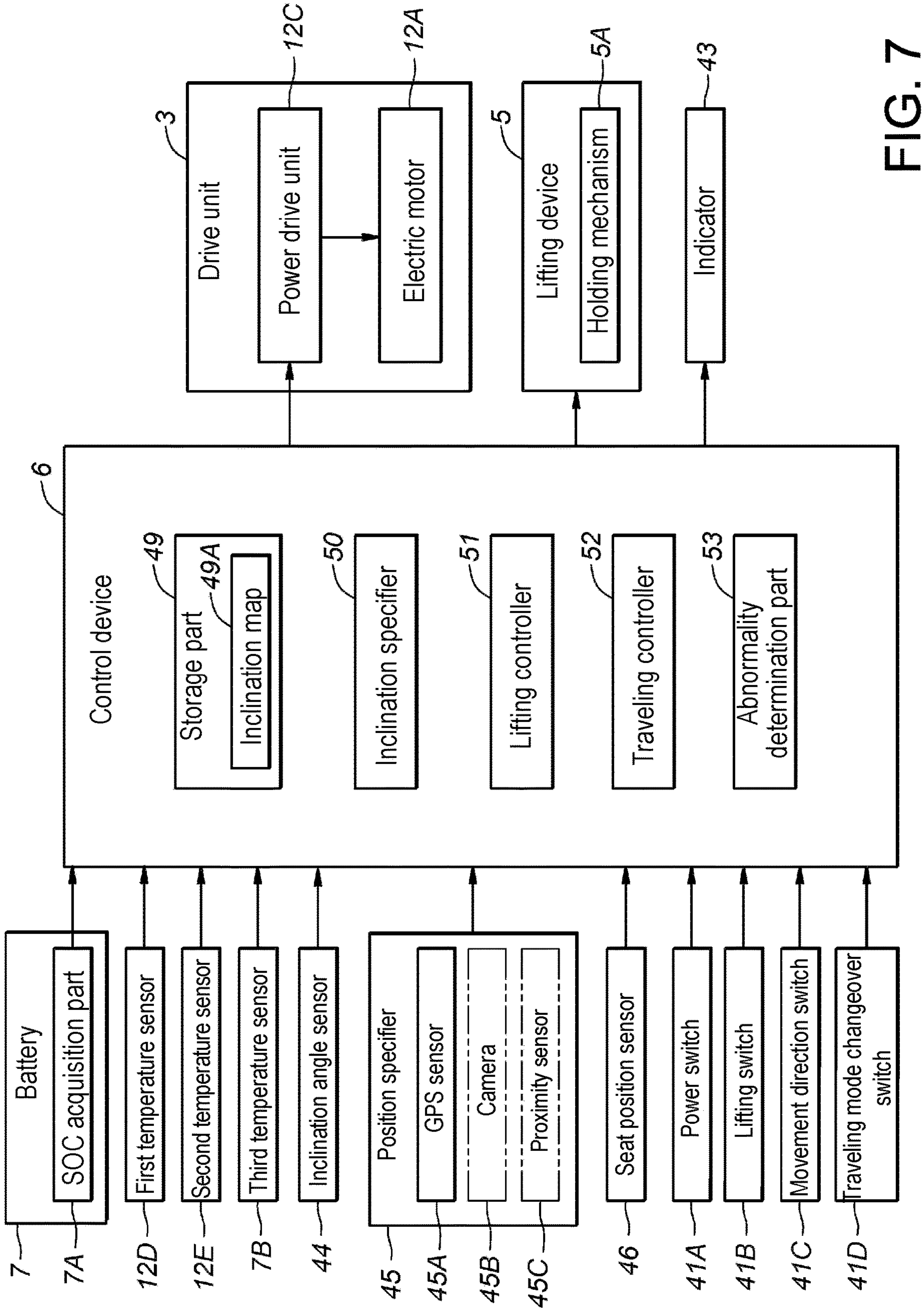
FIG. 7 is a block diagram illustrating a configuration of a control device of a vehicle according to a first embodiment.

As illustrated in FIG. 7, the control device 6 includes, as function parts, a storage part 49, an inclination specifier 50, a lifting controller 51, a traveling controller 52, and an abnormality determination part 53.

The storage part 49 is composed of a storage device and stores various information required for traveling control of the vehicle 1. The storage part 49 stores an inclination map 49A indicating a relationship between a position (x, y) within a region in which a vehicle is movable and the road surface inclination angle δ (x, y) at that position. In the inclination map 49A, each position (x, y) may be represented by a combination of latitude and longitude, or may be coordinates set within a predetermined region.

In detail, the road surface inclination angle δ may be a maximum value of inclination angles of the road surface in all directions within the horizontal plane at each position. The road surface inclination angle δ means a corresponding inclination angle of the road surface with respect to the horizontal plane. The road surface inclination angle δ becomes zero when the road surface is horizontal. The greater the road surface inclination angle δ, the steeper the inclination of the road surface.

The storage part 49 may store a risk map in addition to the inclination map 49A. The risk map may be a numerical value indicating a degree of risk with respect to changing of the seat 4 to the high position within the region in which the vehicle 1 is movable. For example, the risk map may be represented by a numerical value (such as softness) indicating instability of the road surface at each position.

The inclination specifier 50 acquires the position of the vehicle body frame 2 from the position specifier 45. After that, the inclination specifier 50 acquires the road surface inclination angle δ corresponding to the position of the vehicle body frame 2 using the inclination map 49A. The inclination specifier 50 outputs the acquired road surface inclination angle δ to the lifting controller 51 and the traveling controller 52. The inclination specifier 50 is realized by the processor executing a predetermined program.

The lifting controller 51 controls the lifting device 5. The lifting controller 51 is realized by the processor executing a predetermined program.

The traveling controller 52 controls the electric motors 12A of the drive units 3 on the left and right. The traveling controller 52 is realized by the processor executing a predetermined program.

The abnormality determination part 53 determines whether the vehicle 1 has an abnormality. The abnormality determination part 53 may determine whether the vehicle 1 has an abnormality by comparing a value acquired by the SOC acquisition part 7A, the first temperature sensor 12D, the second temperature sensor 12E, the third temperature sensor 7B, the inclination angle sensor 44 and the seat position sensor 46 with a corresponding abnormality determination value. The abnormality determination part 53 may also determine whether the vehicle 1 has an abnormality by acquiring a current in the electric motor 12A and the power drive unit 12C and comparing the same with a corresponding abnormality determination value.

When the seat 4 is at the high position, the control device 6 controls the drive units 3 on the left and right based on the so-called inverted pendulum control in which the inclination angle θf of the vehicle body frame 2 is set to 0 degree. When the inclination angle θf of the vehicle body frame 2 is 0 degree, the center of gravity of the vehicle 1 is located vertically above rotation axes of the drive wheels 8 on the left and right.

When the seat 4 is at the high position, when the user seated in the seat 4 shifts their center of gravity, the upper frame 2B tilts along a movement direction of the center of gravity. The control device 6 performs the inverted pendulum control in which the inclination angle θf is set to 0 degree, and causes the lower frame 2A to move in the direction in which the upper frame 2B tilts. In this way, since the lower frame 2A moves in the direction in which the upper frame 2B tilts, by shifting the center of gravity, the user seated in the seat 4 is able to move the vehicle 1 in any direction.

When the seat 4 is at the high position, the inclination specifier 50 may acquire, in addition to the road surface inclination angle δ at a current position of the vehicle 1, a road surface inclination angle Δ ahead of the vehicle 1 in the traveling direction.

For example, the inclination specifier 50 first calculates the traveling direction based on the inclination angle θf acquired by the inclination angle sensor 44. After that, based on the position of the vehicle body frame 2 and the calculated traveling direction, the inclination specifier 50 calculates a position (hereinafter target position) of a point spaced ahead in the traveling direction by a predetermined distance from the position of the vehicle body frame 2. After that, the inclination specifier 50 acquires a road surface inclination angle $\Delta_0$ at the target position with reference to the inclination map 49A.

When the seat 4 is at the low position, based on a signal from the movement direction switch 41C, the control device 6 controls the drive unit 3 to cause the vehicle 1 to travel. The control device 6 does not perform the inverted pendulum control when the seat 4 is at the low position.

The control device 6 turns on and off the power of the vehicle 1 in response to an operation of the power switch 41A performed by the user. The control device 6 drives the lifting device 5 to lift or lower the seat 4 in response to an operation of the lifting switch 41B performed by the user.

When the user pushes the lifting switch 41B, the control device 6 (processor) executes lifting processing. In the lifting processing, the control device 6 determines whether a condition (hereinafter lifting prohibition condition) for prohibiting lifting is satisfied. When the lifting prohibition condition is not satisfied, the control device 6 controls the lifting device 5 and displaces the seat 4 to the high position.

Figure 8:
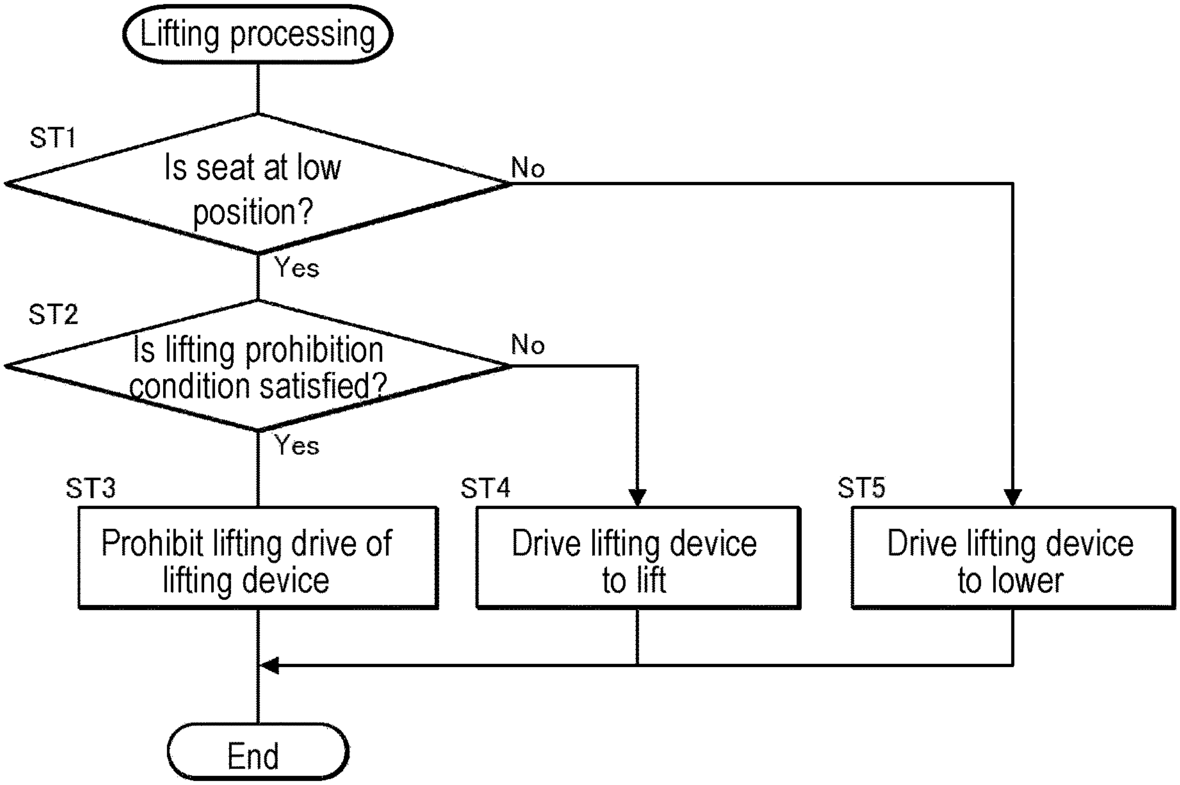
FIG. 8 is a flowchart illustrating a procedure for lifting control.

Next, details of the lifting processing executed by the control device 6 is described with reference to FIG. 8.

At the beginning of the lifting processing, the control device 6 determines whether the seat 4 is at the low position based on a signal from the seat position sensor 46 (ST1).

If the control device 6 determines that the seat 4 is at the low position (a determination result in ST1 is Yes), the control device 6 determines whether the lifting prohibition condition is satisfied (ST2). The lifting prohibition condition includes at least one of following: the road surface inclination angle δ being equal to or greater than a first angle threshold δ1; the temperature Tp of the power drive unit 12C being equal to or greater than a first power drive unit temperature threshold Tp1; the temperature Tm of the electric motor 12A being equal to or greater than a first electric motor temperature threshold Tm1; the temperature Tb of the battery 7 being equal to or greater than a first battery temperature threshold Tb1; the SOC of the battery 7 being equal to or less than a first SOC threshold S1; and the control device 6 detecting an abnormality in the vehicle 1.

When the control device 6 (inclination specifier 50) determines whether the road surface inclination angle δ is equal to or greater than the first angle threshold δ1, based on a position specified by the position specifier 45, the control device 6 specifies the road surface inclination angle δ at that position. In the present embodiment, the control device 6 (inclination specifier 50) acquires latitude and longitude indicating the position of the vehicle 1 from the GPS sensor 45A being the position specifier 45, and acquires the road surface inclination angle δ at that position with reference to the inclination map 49A stored in a storage device.

After that, by comparing the road surface inclination angle δ with the first angle threshold δ1, the control device 6 (lifting controller 51) determines whether the road surface inclination angle δ is equal to or greater than the first angle threshold δ1.

When the seat 4 is at the low position, the four first legs 24 are grounded, and the seat frame 18 is arranged to be parallel to the road surface. The upper frame 2B is able to tilt in the front-rear and left-right directions with respect to the seat frame 18. The inclination angle sensor 44 is provided in the upper frame 2B. Hence, the inclination angle θf detected by the inclination angle sensor 44 does not necessarily match the road surface inclination angle δ.

When the seat 4 moves from the low position to the high position, a plurality of first legs 24 leave the road surface. At this time, since the control device 6 executes the inverted pendulum control to control the inclination angle θf of the upper frame 2B to become 0 degree, the posture of the seat frame 18 changes to be horizontal.

That is, the greater the road surface inclination angle δ, the larger the change in the posture of the seat frame 18 when the first leg 24 leaves the road surface. The first angle threshold δ1 is set for the purpose of prohibiting the seat 4 from moving to the high position in the case where a large change occurs in the posture of the seat frame 18 when the first leg 24 leaves the road surface.

When the temperature Tp of the power drive unit 12C rises, there is a risk that the power drive unit 12C may be damaged. When the temperature Tm of the electric motor 12A rises, there is a risk that the electric motor 12A may be damaged. When the temperature Tb of the battery 7 rises, there is a risk that the battery 7 may be damaged. When the seat 4 moves from the low position to the high position, the control device 6 starts the inverted pendulum control. Since the electric motor 12A needs to be constantly controlled during execution of the inverted pendulum control, the temperature Tp of the power drive unit 12C, the temperature Tm of the electric motor 12A, and the temperature Tb of the battery 7 are likely to rise. The first power drive unit temperature threshold Tp1, the first electric motor temperature threshold Tm1, and the first battery temperature threshold Tb1 are set for the purpose of prohibiting the seat 4 from moving to the high position in the case where the temperature Tp of the power drive unit 12C, the temperature Tm of the electric motor 12A, and the temperature Tb of the battery 7 are high.

When the SOC of the battery 7 decreases, there is a risk that the electric power supplied to the electric motor 12A may decrease and a drive rotation speed of the electric motor 12A may decrease. There is a possibility that the battery 7 may stop outputting for overdischarge protection. The first SOC threshold S1 is set for the purpose of prohibiting the seat 4 from moving to the high position in the case where the SOC is low.

When the lifting prohibition condition is satisfied (a determination result in ST2 is Yes), the control device 6 prohibits the lifting drive performed by the lifting device 5. Accordingly, even if the user pushes the lifting switch 41B, the seat 4 will not be lifted. At this time, the control device 6 may cause the indicator 43 to give an error notification. In other embodiments, the control device 6 may cause an audio output part such as a speaker or a buzzer to give an error notification by sound.

When the lifting prohibition condition is not satisfied (the determination result in ST2 is No), the control device 6 drives the lifting device 5 to lift (ST4). The control device 6 drives the lifting device 5 to lift until the seat 4 reaches the high position. The control device 6 determines whether the seat 4 has reached the high position based on the signal from the seat position sensor 46.

If the control device 6 determines in step ST1 that the seat 4 is not at the low position, the control device 6 drives the lifting device 5 to lower (ST5). The control device 6 drives the lifting device 5 to lower until the seat 4 reaches the low position. The control device 6 determines whether the seat 4 has reached the low position based on the signal from the seat position sensor 46.

According to the above lifting control, when the seat 4 is at the low position and the lifting prohibition condition is satisfied, the control device prohibits the lifting drive of the lifting device 5. Hence, the safety of the vehicle 1 is improved. If the SOC decreases, or the temperature Tp of the power drive unit 12C is high, or the road surface inclination angle δ is equal to or greater than a predetermined value (first angle threshold δ1), movement of the seat 4 to the high position is prohibited. Accordingly, when the road surface is largely inclined, since movement of the seat 4 to the high position is prohibited, the safety of the vehicle 1 is improved.

When the road surface inclination angle δ is equal to or greater than the first angle threshold δ1, the control device 6 determines that the lifting prohibition condition is satisfied. Hence, determination as to the lifting prohibition condition is easy, and the processing thereof is simple.

The control device 6 acquires latitude x and longitude y indicating the position of the vehicle 1 from the GPS sensor 45A being the position specifier 45, and acquires the road surface inclination angle δ with reference to the inclination map 49A. Hence, the configuration for acquiring the road surface inclination angle δ is simplified, and the road surface inclination angle δ is easy to acquire. Since there is no need to separately provide a tilt sensor in the vehicle 1 to acquire the road surface inclination angle δ, the manufacturing cost of the vehicle 1 can be reduced.

By referring to the inclination map 49A, it is possible to determine the road surface inclination angle Δ (for example, the road surface inclination angle Δ at the target position) of the road surface at the position ahead in the traveling direction.

Figure 9:
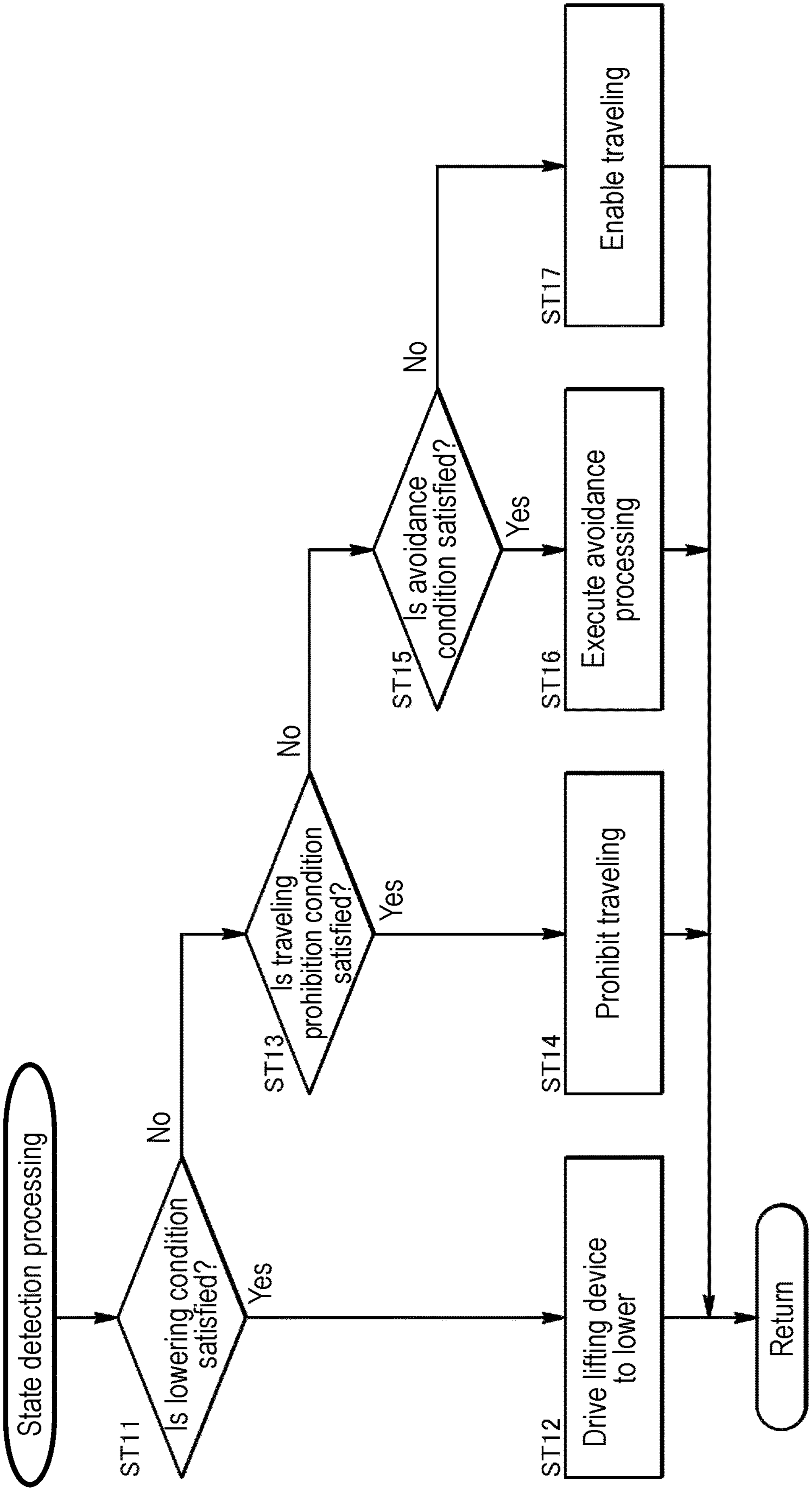
FIG. 9 is a flowchart illustrating a procedure for state detection processing.

When the seat 4 is at the high position, the control device 6 executes state detection processing illustrated in FIG. 9 at predetermined time intervals.

In the state detection processing, the control device 6 first determines whether a lowering condition is satisfied (ST11). The lowering condition includes at least one of following: the temperature Tp of the power drive unit 12C being equal to or greater than a second power drive unit temperature threshold Tp2 (which is equal to or greater than the first power drive unit temperature threshold Tp1); the temperature Tm of the electric motor 12A being equal to or greater than a second electric motor temperature threshold Tm2 (which is equal to or greater than the first electric motor temperature threshold Tm1); the temperature Tb of the battery 7 being equal to or greater than a second battery temperature threshold Tb2 (which is equal to or greater than the first battery temperature threshold Tb1); the SOC of the battery 7 being equal to or less than a second SOC threshold S2 (which is equal to or less than the first SOC threshold S1); and the road surface inclination angle Δ of the road surface ahead in the traveling direction being equal to or greater than a second angle threshold δ2.

In the state detection processing, similarly to the lifting processing, the control device 6 (inclination specifier 50) acquires the position of the vehicle 1 from the position specifier 45, and acquires the road surface inclination angle Δ of the road surface ahead in the traveling direction with reference to the inclination map 49A. Here, the road surface inclination angle Δ of the road surface ahead in the traveling direction acquired by the control device 6 may be the road surface inclination angle $\Delta_0$ of the road surface at the target position. After that, the control device 6 determines whether the road surface inclination angle Δ is equal to or greater than the second angle threshold δ2. The second angle threshold δ2 is preferably less than the first angle threshold δ1.

If the lowering condition is satisfied (a determination result in ST11 is Yes), the control device 6 drives the lifting device 5 to lower (ST12). That is, the seat 4 is forcibly moved from the high position to the low position. The lowering drive of the lifting device 5 may be performed by driving of an electric motor. The control device 6 may release the holding mechanism 5A of the lifting device 5 to thereby cause the seat 4 to be lowered.

If the lowering condition is not satisfied (the determination result in ST11 is No), the control device 6 determines whether a traveling prohibition condition is satisfied (ST13). The traveling prohibition condition includes at least one of following: the temperature Tp of the power drive unit 12C being equal to or greater than a third power drive unit temperature threshold Tp3 (which is less than the second power drive unit temperature threshold Tp2); the temperature Tm of the electric motor 12A being equal to or greater than a third electric motor temperature threshold Tm3 (which is less than the second electric motor temperature threshold Tm2); the temperature Tb of the battery 7 being equal to or greater than a third battery temperature threshold Tb3 (which is less than the second battery temperature threshold Tb2); and the SOC of the battery 7 being equal to or less than a third SOC threshold S3 (which is greater than the second SOC threshold S2).

If the traveling prohibition condition is satisfied (a determination result in ST13 is Yes), the control device 6 prohibits the vehicle 1 from traveling (ST14). The control device 6 may, for example, set a traveling prohibition flag to 1. When the traveling prohibition flag is 1, the control device 6 performs posture control based on the inverted pendulum control, and reduces the amount of change in a horizontal position of the vehicle 1 as much as possible, thereby prohibiting traveling drive of the drive unit 3.

If the traveling prohibition condition is not satisfied (the determination result in ST13 is No), the control device 6 determines whether an avoidance condition is satisfied (ST15). The avoidance condition includes that the road surface inclination angle Δ ahead of the vehicle 1 in the traveling direction is equal to or greater than a third angle threshold δ3. In the present embodiment, the avoidance condition includes that the road surface inclination angle Δ at a position reached by forwardly advancing a predetermined distance in the traveling direction from the current position of the vehicle 1 is equal to or greater than the third angle threshold δ3. Here, the position reached by forwardly advancing the predetermined distance in the traveling direction from the current position of the vehicle 1 may be the target position, and the avoidance condition may include that the road surface inclination angle Δ at the target position is equal to or greater than the third angle threshold δ3. The third angle threshold δ3 is preferably greater than the first angle threshold δ1 and greater than the second angle threshold δ2.

Other avoidance conditions may include that a degree of risk ahead of the vehicle 1 in the traveling direction (specifically, a degree of risk at the position reached by forwardly advancing the predetermined distance in the traveling direction from the current position of the vehicle 1) is equal to or greater than a predetermined threshold.

If the avoidance condition is satisfied (a determination result in S15 is Yes), the control device 6 executes avoidance processing for controlling the drive unit 3 to avoid forward movement in the traveling direction (ST16). In the present embodiment, by executing the avoidance processing, the control device 6 controls the drive unit 3 so that the vehicle 1 faces in a direction opposite to the traveling direction. In addition, by executing the avoidance processing, the control device 6 may cause the vehicle 1 to move in a direction (for example, to the left or right or rearward with respect to the traveling direction) different from forward in the traveling direction without changing the direction of the vehicle 1. At this time, the control device 6 may cause the indicator 43 to emit light in a predetermined manner, or may cause an audio output part such as a speaker or a buzzer to give a notification by sound.

If the avoidance condition is not satisfied (the determination result in ST15 is No), the control device 6 enables traveling of the vehicle 1 (ST17). At this time, the control device 6 may, for example, set the traveling prohibition flag to 0. When the traveling prohibition flag is 0, the control device 6 may enable traveling drive of the drive unit 3 based on the inclination angle θf of the vehicle body frame 2.

By the above state detection processing, when the seat 4 is at the high position and the lowering condition is satisfied, the seat 4 is lowered to the low position. For example, when the road surface inclination angle Δ of the road surface ahead in the traveling direction is equal to or greater than the second angle threshold δ2 and the vehicle 1 attempts to move to a steep slope region, the seat 4 is lowered to the low position. Accordingly, the safety of the vehicle 1 is improved.

When the seat 4 is at the high position and the traveling prohibition condition is satisfied, since the vehicle 1 is prohibited from traveling, the safety of the vehicle 1 is improved. When the avoidance condition is satisfied, forward movement of the vehicle 1 in the traveling direction is avoided. For example, when the road surface inclination angle δ of the road surface ahead in the traveling direction is equal to or greater than the third angle threshold δ3 and the vehicle 1 attempts to move to a steep slope region, forward movement of the vehicle 1 in the traveling direction is avoided. Accordingly, the safety of the vehicle 1 is improved.

Thus, in the disclosure, a safe and highly convenient vehicle can be provided to people in vulnerable positions such as the elderly, the disabled, and children among traffic participants, and this can accordingly contribute to the development of a sustainable transportation system.

In this way, by setting the lifting prohibition condition, the control device 6 prevents the seat 4 from being at the high position (that is, prevents the seat 4 from occupying the high position) when the lifting prohibition condition is satisfied. Accordingly, for example, when the road surface inclination angle δ is equal to or greater than the first angle threshold δ1, since the seat 4 is prevented from being at the high position, the safety of the vehicle 1 may be improved.

Second Embodiment

Figure 10:
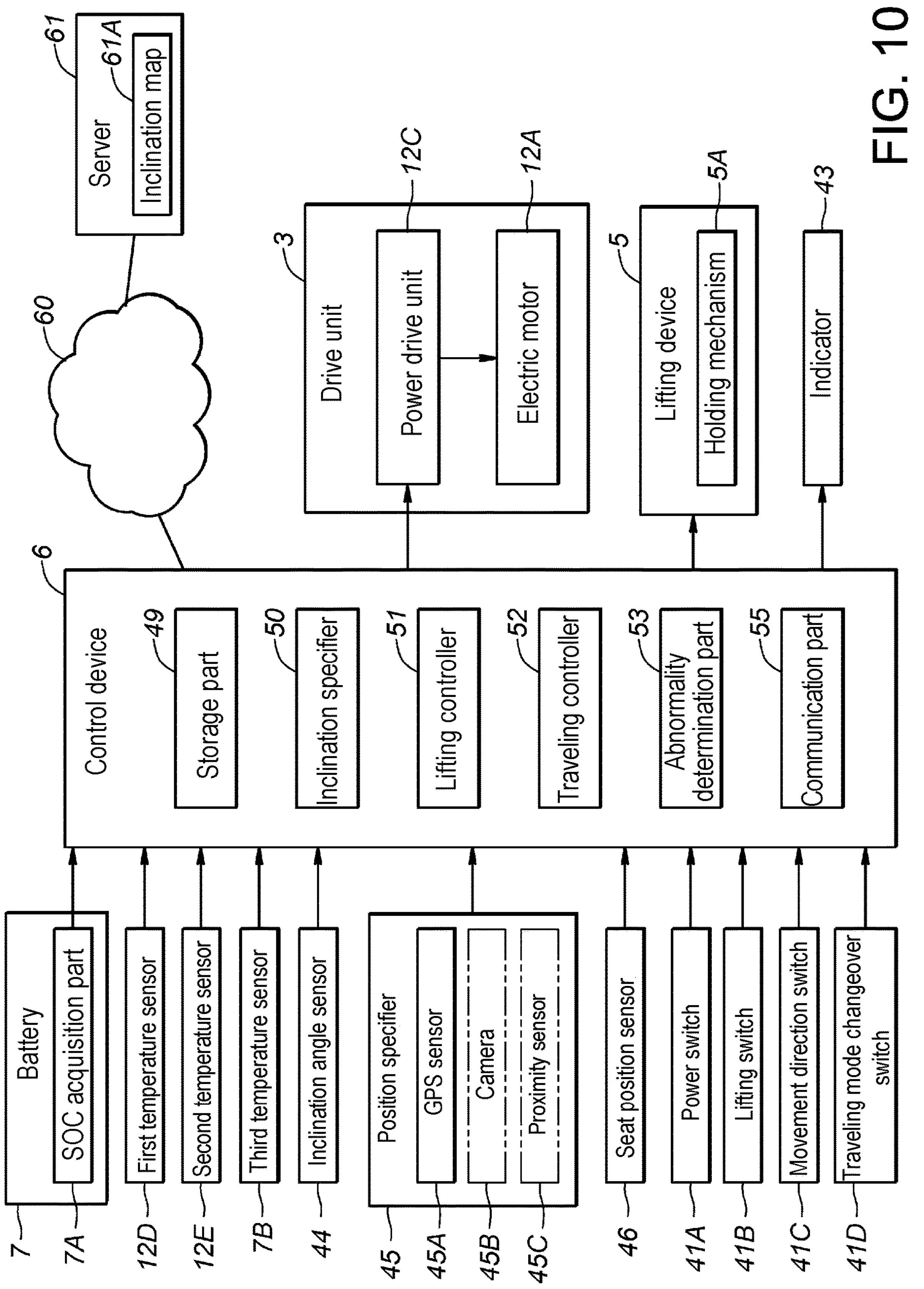
FIG. 10 is a block diagram illustrating a configuration of a control device and a server of a vehicle according to a second embodiment.

As illustrated in FIG. 10, the vehicle 1 according to a second embodiment differs from the first embodiment in that the storage part 49 does not store the inclination map 49A and that the control device 6 includes a communication part 55, and in the configuration of the inclination specifier 50 acquiring the road surface inclination angles δ and Δ ($\Delta_0$). The other configurations are the same as those of the first embodiment, and therefore, descriptions of the other configurations will be omitted.

The communication part 55 is composed of an interface for communicating with other computers via a network 60. The network 60 may be, for example, the Internet. The inclination specifier 50 connects to the network 60 via the communication part 55 and communicates with a server 61. The server 61 is composed of a computer equipped with a processor or a storage device, and stores an inclination map 61A in the storage device. When receiving a signal (request signal) indicating a position from the inclination specifier 50, the server 61 acquires the road surface inclination angles δ and Δ ($\Delta_0$) at that position with reference to the inclination map 61A. After that, the server 61 transmits the road surface inclination angles δ and Δ ($\Delta_0$) at the position corresponding to the request signal to the inclination specifier 50 via the network 60.

When acquiring a specified position from the position specifier 45, the inclination specifier 50 transmits the request signal corresponding to that position to the server 61. When receiving the request signal, the server 61 transmits the corresponding road surface inclination angles δ and Δ ($\Delta_0$) to the inclination specifier 50. Accordingly, the inclination specifier 50 acquires the road surface inclination angles δ and A corresponding to the specified position from the position specifier 45.

When determining whether the lifting prohibition condition is satisfied (ST2) in the lifting processing, based on the position specified by the position specifier 45, the control device 6 acquires a corresponding road surface inclination angle δ from the server 61, and determines whether the road surface inclination angle δ is equal to or greater than the first angle threshold δ1.

When determining whether the lowering condition is satisfied in the state detection processing, the control device 6 acquires the position (in the present embodiment, the target position) reached by forwardly advancing the predetermined distance in the traveling direction from the current position of the vehicle 1, and transmits the request signal including the acquired position to the server 61. With reference to the inclination map 61A, the server 61 acquires the road surface inclination angle Δ (in the present embodiment, the road surface inclination angle $\Delta_0$ at the target position) at the position reached by forwardly advancing the predetermined distance in the traveling direction, and transmits the same to the control device 6. When acquiring from the server 61 the road surface inclination angle Δ (the road surface inclination angle Δ at the target position) of the road surface at the position ahead in the traveling direction, the control device 6 determines whether the road surface inclination angle Δ ($\Delta_0$) at that position is equal to or greater than the second angle threshold δ2.

Similarly, when determining whether the avoidance condition is satisfied (ST15), the control device 6 acquires the position (in the present embodiment, the target position) reached by forwardly advancing the predetermined distance in the traveling direction from the current position of the vehicle 1, and transmits the request signal including the acquired position to the server 61. With reference to the inclination map 61A, the server 61 acquires the road surface inclination angle Δ (in the present embodiment, the road surface inclination angle $\Delta_0$ at the target position) at the position reached by forwardly advancing the predetermined distance in the traveling direction, and transmits the same to the control device 6. When acquiring from the server 61 the road surface inclination angle Δ (the road surface inclination angle $\Delta_0$ at the target position) of the road surface at the position ahead in the traveling direction, the control device 6 determines whether the road surface inclination angle Δ ($\Delta_0$) at that position is equal to or greater than the third angle threshold δ3.

With this configuration, even if the vehicle 1 has a large movement range and the amount of data in the inclination map 61A is large, the control device 6 is able to easily acquire the road surface inclination angles δ and Δ ($\Delta_0$) at each position.

Although specific embodiments have been described above, the disclosure is not limited to the above embodiments and may be widely modified and implemented. The contents of the lifting prohibition condition, the lowering condition, and the traveling prohibition condition may be changed depending on the purpose. A speed sensor may be provided to measure a speed of the vehicle 1, and when the speed is equal to or higher than a predetermined threshold, the lifting prohibition condition may be satisfied.

In the above embodiments, an example has been described in which the lowering condition includes that the road surface inclination angle Δ of the road surface at the position ahead in the traveling direction is equal to or greater than the second angle threshold δ2 and the avoidance condition includes that the road surface inclination angle Δ of the road surface at the position ahead in the traveling direction is equal to or greater than the third angle threshold δ3. However, the position ahead in the traveling direction used in determining the lowering condition and the position ahead in the traveling direction used in determining the avoidance condition may be positions reached by advancing the same distance or by advancing different distances in the traveling direction as seen from the vehicle 1.

Specifically, the lowering condition may be configured to include that the road surface inclination angle Δ of the road surface at a point reached by forwardly advancing a second distance in the traveling direction is equal to or greater than the second angle threshold δ2, and the avoidance condition may be configured to include that the road surface inclination angle Δ of the road surface at a point reached by forwardly advancing a third distance in the traveling direction is equal to or greater than the third angle threshold δ3. The second distance may be set smaller than the third distance.

The disclosure is not limited to a magnitude relationship between the first angle threshold δ1, the second angle threshold δ2, and the third angle threshold δ3. However, by setting the third angle threshold δ3 to be greater than the first angle threshold δ1 and the first angle threshold δ1 to be greater than the second angle threshold δ2, the region to be avoided within the movable range can be reduced, and the seat 4 can be easily lowered. Thus, the safety of the vehicle 1 may be improved.

In the above embodiments, the control device 6 lifts or lowers the seat 4 between the low position and the high position, and the roller 23 (that is, the first leg 24) is displaced to the landing position where the roller 23 is in contact with the road surface and the lifting position where the roller 23 is away from the road surface. However, the disclosure is not limited to this aspect. The control device 6 may be configured to change only the position of the roller 23 without changing the position of the seat 4. For example, the vehicle 1 may include the lifting device 5 that displaces the roller 23 between the landing position and the lifting position by extending and contracting the first leg 24, and the lifting device 5 may be configured to be controlled by the control device 6.

Even in this case, like the case of lifting or lowering the seat 4, the control device 6 may specify the road surface inclination angle δ of the road surface at a position where the vehicle 1 is arranged based on the detection result of the position specifier 45, and may control the lifting device 5 so that the roller 23 is prohibited from occupying the lifting position and the roller 23 (first leg 24) is prohibited from leaving the road surface when the lifting prohibition condition including the condition related to the road surface inclination angle δ is satisfied.

What is claimed is:

1. A vehicle, comprising:

a vehicle body frame;

a drive unit, provided in the vehicle body frame and movable on a road surface;

a seat, arranged above the vehicle body frame and supporting buttocks of a user;

a lifting device, provided between the vehicle body frame and the seat and lifting or lowering the seat between a low position and a high position;

a position specifier, provided in the vehicle body frame and detecting a position of the vehicle; and a control device, controlling the drive unit and the lifting device, wherein the control device comprises an inclination specifier that specifies a road surface inclination angle of the road surface at the position of the vehicle based on a detection result of the position specifier; and in response to the seat being at the low position and a lifting prohibition condition comprising a condition related to the road surface inclination angle being satisfied, the control device prohibits lifting drive of the lifting device.

2. The vehicle according to claim 1, wherein the control device stores an inclination map indicating a relationship between the position and the road surface inclination angle; and, based on the inclination map, the inclination specifier specifies the road surface inclination angle at the position specified by the position specifier.

3. The vehicle according to claim 1, wherein the control device is configured to be able to communicate with a server that stores an inclination map indicating a relationship between the position and the road surface inclination angle; and the inclination specifier communicates with the server, thereby specifying the road surface inclination angle at the position specified by the position specifier.

4. The vehicle according to claim 1, wherein, in response to the seat being at the high position and a lowering condition being satisfied, the control device performs lowering drive of the lifting device; and the lowering condition comprises that the road surface inclination angle of the road surface ahead in a traveling direction is equal to or greater than a second angle threshold.

5. The vehicle according to claim 1, wherein, in response to the seat being at the high position and the road surface ahead in a traveling direction satisfying an avoidance condition, the control device controls the drive unit to avoid forward movement in the traveling direction; and the avoidance condition comprises that the road surface inclination angle of the road surface ahead in the traveling direction is equal to or greater than a third angle threshold.

6. The vehicle according to claim 1, wherein the vehicle further comprises at least one leg extending downward from the seat and having a roller at a lower end;

in response to the seat being at the high position, the roller leaves the road surface; and in response to the seat being at the low position, the roller contacts the road surface.

7. The vehicle according to claim 1, wherein the control device controls the drive unit based on inverted pendulum control.

8. The vehicle according to claim 1, wherein the drive unit is movable in all directions along the road surface.

9. The vehicle according to claim 1, wherein the lifting prohibition condition comprises at least a condition that the road surface inclination angle specified by the inclination specifier is equal to or greater than a first angle threshold.

10. The vehicle according to claim 9, wherein the drive unit comprises an electric motor and a power drive unit that supplies electric power to the electric motor;

the control device determines whether the vehicle has an abnormality;

the vehicle further comprises:

a battery, provided in the vehicle body frame;

an SOC acquisition part, acquiring a state of charge of the battery; and a temperature acquisition part, acquiring a temperature of at least one of the power drive unit, the electric motor, and the battery; and the lifting prohibition condition comprises at least one of following: the road surface inclination angle being equal to or greater than the first angle threshold; the temperature of the power drive unit being equal to or greater than a first power drive unit temperature threshold; the temperature of the electric motor being equal to or greater than a first electric motor temperature threshold; the temperature of the battery being equal to or greater than a first battery temperature threshold; the state of charge of the battery being equal to or less than a first SOC threshold; and the control device detecting an abnormality in the vehicle.

11. A vehicle, comprising:

a vehicle body frame;

a drive unit, provided in the vehicle body frame and causing the vehicle body frame to move with respect to a road surface;

a roller, provided to be able to be lifted and lowered with respect to the vehicle body frame and displaceable to a landing position in contact with the road surface and a lifting position away from the road surface;

a lifting device, lifting or lowering the roller between the landing position and the lifting position;

a position specifier, provided in the vehicle body frame and detecting a position of the vehicle; and a control device, controlling the drive unit and the lifting device, wherein the control device comprises an inclination specifier that specifies a road surface inclination angle of the road surface at the position of the vehicle based on a detection result of the position specifier, and, in response to a lifting prohibition condition comprising a condition related to the road surface inclination angle being satisfied, the control device controls the lifting device to prohibit the roller from occupying the lifting position.

* * * * *